(12) United States Patent
Kern et al.

(10) Patent No.: US 7,954,106 B2
(45) Date of Patent: May 31, 2011

(54) ESTIMATING RESOURCE USAGE SYSTEM FOR ALLOCATING RESOURCES TO TASKS BASED UPON THE RATING VALUE OF TASKS AND RESOURCES MAPPING

(75) Inventors: Mathias Kern, Ipswich (GB); George Anim-Ansah, Ipswich (GB); Gilbert Kwame Owusu, Kesgrave (GB); Chris Voudouris, Ipswich (GB)

(73) Assignee: British Telecommunications public limited company, London (GB)

( * ) Notice: Subject to any disclaimer, the term of this patent is extended or adjusted under 35 U.S.C. 154(b) by 1465 days.

(21) Appl. No.: 11/305,346

(22) Filed: Dec. 19, 2005

(65) Prior Publication Data
US 2007/0143764 A1    Jun. 21, 2007

(51) Int. Cl.
*G06F 9/46*    (2006.01)
(52) U.S. Cl. .......................... 718/104; 718/100; 718/102
(58) Field of Classification Search .................. 718/100, 718/102, 104, 105
See application file for complete search history.

(56) References Cited

U.S. PATENT DOCUMENTS

| | | | | |
|---|---|---|---|---|
| 6,993,765 B2* | 1/2006 | Suzuki et al. | .................. | 718/102 |
| 7,093,250 B1* | 8/2006 | Rector | .......................... | 718/100 |
| 7,426,729 B2* | 9/2008 | Avvari et al. | .................. | 718/104 |
| 7,512,947 B2* | 3/2009 | Moore | .......................... | 718/102 |
| 7,721,286 B2* | 5/2010 | D'Souza | ....................... | 718/100 |
| 2004/0015976 A1* | 1/2004 | Lam | .............................. | 718/104 |
| 2004/0103413 A1* | 5/2004 | Mandava et al. | .............. | 718/100 |
| 2004/0249743 A1 | 12/2004 | Virginas et al. | | |
| 2005/0015504 A1 | 1/2005 | Dorne et al. | | |
| 2005/0034126 A1* | 2/2005 | Moore | .......................... | 718/100 |
| 2005/0177824 A1* | 8/2005 | Kipman et al. | ................ | 717/162 |
| 2007/0005887 A1* | 1/2007 | Larson | .......................... | 711/118 |

FOREIGN PATENT DOCUMENTS

| WO | WO 98/02297 | 5/1998 |
|---|---|---|
| WO | WO 02/056249 A2 | 7/2002 |

\* cited by examiner

*Primary Examiner* — Meng-Ai An
*Assistant Examiner* — Tammy Lee
(74) *Attorney, Agent, or Firm* — Nixon & Vanderhye P.C.

(57) ABSTRACT

A method for allocating resources of a group of resources to tasks of a group of tasks, the method comprising: forming a resource set comprising a resource record for each of the resources of the group of resources, each resource record having one or more fields representative of attributes of the respective resource; forming a task set comprising a task record for each of the tasks of the group of resources, each task record having one or more fields, each field holding data representative of an attribute of the respective task; condensing the task set by one or more iterations of the steps of: i. selecting two or more tasks of the task set; ii. adding to the task set an aggregate task record having one or more fields, each such field corresponding to a field of each of the task records of the selected tasks and holding data representative of the collective attributes of the task records of the selected tasks in those fields; and iii. removing the task records of the selected tasks from the task set; forming at least two mappings of some or all of the members of the resource set on to one or more members of the task set; calculating, for each of the mappings, a rating value dependent on the allocation of resources to the or each aggregate task in that mapping; comparing the rating values of the mappings; and selecting one of the mappings for further processing in dependence on the result of the said comparing step.

15 Claims, 3 Drawing Sheets

```
FOR all planning periods PlanningPeriod[i]:

101. Resources[i] = determineAvailableResources( PlanningPeriod[i])

102. JobAggr[i] = createUndoneJobAggregates(UndoneJobs[i])

103. BaseLinePlan[i] = createBaseLinePlan(Techs[i], JobAggr[i])

104. OptimisedPlan[i] = optimisePlan(BaseLinePlan[i], JobAggr[i])

105. UndoneJobs[i+1] =
    determineUndoneJobs(UndoneJobs[i],OptimisedPlan[i])

106. Output[i] = analyseSolution(UndoneJobs[i], OptimisedPlan[i])

RETURN {Output[1],Output[2], …}
```

Figure 3

```
FOR all planning periods PlanningPeriod[i]:

101. Resources[i] = determineAvailableResources( PlanningPeriod[i])

102. JobAggr[i] = createUndoneJobAggregates(UndoneJobs[i])

103. BaseLinePlan[i] = createBaseLinePlan(Techs[i], JobAggr[i])

104. OptimisedPlan[i] = optimisePlan(BaseLinePlan[i], JobAggr[i])

105. UndoneJobs[i+1] =
  determineUndoneJobs(UndoneJobs[i],OptimisedPlan[i])

106. Output[i] = analyseSolution(UndoneJobs[i], OptimisedPlan[i])

RETURN {Output[1],Output[2], ...}
```

Figure 4

```
optimisePlan ( BaseLinePlan, JobAggregates )
OptimisedPlan = BaseLinePlan
DO
   FOR each Resource[i]
      IF improvement
         MoveTo( OptimisedPlan, Resource[i] )
   FOR each pair Resource[i], Resource[j]
      IF improvement
         Swap ( OptimisedPlan, Resource[i], Resource[j] )
   FOR each chain Resource[i], Resource[j], ...
      IF improvement
         Replace-Move( OptimisedPlan, Technician[i], Technician[j], ...)
WHILE obj(OptimisedPlan) improves
RETURN OptimisedPlan
```

ESTIMATING RESOURCE USAGE SYSTEM FOR ALLOCATING RESOURCES TO TASKS BASED UPON THE RATING VALUE OF TASKS AND RESOURCES MAPPING

BACKGROUND OF THE INVENTION

This invention relates to estimating the usage of resources. The invention may, for example, be applied to generating capacity or deployment plans in a service organisation.

In a large service organisation there may be many tasks that need to be performed in order to meet demand for work from customers. Each of those tasks may have certain attributes that need to be taken into account in determining how and when the task is to be completed. Those attributes may, for instance, include the urgency of the task, the importance of the task, the location at which the task needs to be performed and the skills that are required in order to complete the task.

The service organisation may have a number of resources that can be deployed in the completion of tasks. Those resources could, for example, be engineers, equipment or data processing resources. Each resource may have certain attributes that can be taken into account when the organisation allocates its resources for the completion of the outstanding tasks. Those attributes may include the skills or capabilities of the resource and the location of the resource.

Service industries are coming under increasing pressure to provide an efficient and cost-effective service to customers. In order to achieve this it is important to align the demand for services as effectively as possible with the supply of resources. This requires the organisation to carry out a capacity planning process in order to determine how best to allocate the available resources to the outstanding tasks. In a large service organisation such as a regional or national telecommunications network this planning process is extremely complex. There may be many thousands of tasks and resources that need to be paired with each other. The capacity planning process can also provide information on whether there is underutilisation of any of the resources, or whether more resources are needed. If there is insufficient capacity to perform all the tasks then a decision will have to be taken on which tasks should be deferred.

Conventional planning is carried out at three levels: a "capacity" level that provides information on the overall balance of customer demand with resource supply; a "deployment" level that suggests which resources can be allocated to each task; and a "schedule" level that represents the allocation of specific resources to specific tasks.

In a conventional capacity planning system a "workstack" is defined, representing the demand by customers for tasks (jobs) to be performed over a period of time. The workstack may show information such as the job demand for each day, how many jobs can be done on that day, how many jobs have to be done on that day and how many jobs have to be done in the future. The workstack may be broken down into different categories to illustrate and distinguish different components of the workstack. At the capacity planning level, a resource list is defined showing how many technicians are available and how many of the available technicians can be used. This is compared with the workstack to determine how many of the available technicians are likely to be under-utilised and how many technicians will be needed to meet the demand fully. A high-level capacity plan for technicians may, for instance, return the following information:

20 technicians are needed in location A to do 40 jobs requiring skill S
5 technicians are under utilised—identification of under-utilisation
15 additional technicians are needed in order to satisfy the full demand The deployment plan is more detailed than the capacity plan. Whereas the capacity plan gives an overall view of the supply in relation to the potential demand, the deployment plan goes a step further in suggesting how best to use the available technicians to satisfy the demand. The deployment plan can be generated in advance, and so present deployment plans typically do not take account of factors such as sickness or downtime of resources that can occur hour-by-hour when the tasks actually come to be performed.

The deployment plan may yield information such as:
technician T should be sent to location A working on jobs requiring skill S Finally, the schedule plan represents the allocation of specific resources to specific tasks. The schedule plan may yield information of the form:
technician T will do job J1 in location A requiring skill S at 9.30 AM
technician T will do job J2 in location B requiring skill S at 10.00 AM A number of factors and issues combine to make the generation of capacity and deployment plans a complex and challenging problem. The issues include business objectives and technical difficulty.

In practice, planning to cope with service demand is performed with the aim of achieving a set of business goals. These goals can typically be classified into two categories: those that aim at increasing the quality of service delivered to customers and those that aim at reducing cost for the service provider. These categories are often in conflict since enhanced quality of service often involves greater cost to the business. Possible indicators of quality of service include:
satisfying demand with correctly equipped and placed resources,
satisfying as much demand as possible,
satisfying high priority demand preferentially and
satisfying demand within agreed time limits.

Possible steps to reduce costs depend on the kind of resources for which the planning is being performed. In the case where the resources represent technicians the steps may include:
deploying resources in accordance with their own geographical preferences,
deploying technicians to their preferred skills to avoid efficiency losses,
deploying technicians to their preferred/agreed rosters,
deploying technicians so that their labour is fully utilised,
deploying available technicians first before bringing in further manpower on overtime or as contractors and
identifying underutilised technicians and making them available for reassignment.

The technical difficulty of the problem arises from its combinatorial complexity. There may be many attributes of each task and of each resource, and many thousands of tasks and resources. Computing a suitable assignment of resources to tasks is computationally very demanding. For that reason it is normally impossible to achieve an acceptable solution manually: computerised processing must be employed.

A system for solving this problem should preferably scale well so that it is capable of performing well for large sets of tasks and resources and should be capable of providing a solution in an acceptable period of time.

SUMMARY OF THE INVENTION

According to one aspect of the present invention there is provided a method for allocating resources of a group of resources to tasks of a group of tasks, the method comprising: forming a resource set comprising a resource record for resources of the group of resources, each resource record having one or more fields representative of attributes of the respective resource; forming a task set comprising a task record for tasks of the group of tasks, each task record having one or more fields, each field holding data representative of an attribute of the respective task; condensing the task set by one or more iterations of the steps of: i. selecting two or more tasks of the task set; ii. adding to the task set an aggregate task record having one or more fields, each such field corresponding to a field of each of the task records of the selected tasks and holding data representative of the collective attributes of the task records of the selected tasks in those fields; and iii. removing the task records of the selected tasks from the task set; forming at least two mappings of some or all of the members of the resource set on to one or more members of the task set; calculating, for each of the mappings, a rating value dependent on the allocation of resources to the or each aggregate task in that mapping; comparing the rating values of the mappings; and selecting one of the mappings for further processing in dependence on the result of the said comparing step.

According to a second aspect of the present invention there is provided a computer configured to perform the said method.

The method may comprise condensing the task set by multiple iterations of the steps i to iii until all task records have been removed from the task set.

The method may comprise comprising condensing the resource set by one or more iterations of the steps of: a. selecting two or more resources of the resource set; b. adding to the resource set an aggregate resource record having one or more fields, each such field corresponding to a field of each of the resource records of the selected resources and holding data representative of the collective attributes of the resource records of the selected resources in those fields; and c. removing the resource records of the selected resources from the resource set.

The method may comprise condensing the resource set by multiple iterations of the steps a to c until all resource records have been removed from the resource set.

The attributes of each task record and of each aggregate task record may include an importance attribute indicative of an importance of the respective task and a volume attribute indicative of the volume of the respective task.

The attributes of each resource record and of each aggregate resource record may include a productivity attribute indicative of the productivity of the respective resource.

The rating value of each mapping may be calculated in dependence on a clearance score for each member of the task set that is in that mapping mapped to a member of the resource set. The clearance score for a record may be the product of the importance attribute of that member and the volume attribute of that member divided by the productivity attribute of the member of the resource set to which it is mapped.

The rating value of each mapping may be calculated in dependence on the sum of the clearance scores for all members of the task set that are in the mapping mapped to a member of the resource set.

The rating value of each mapping may be calculated in dependence on the sum of the product of the clearance score for each member of the task set that is in the mapping mapped to a member of the resource set and a weighting value representative of the beneficial utilisation of the resource record that is in that mapping mapped to the respective member of the task set.

The attributes of each resource record and of each aggregate resource record may include one or more attributes indicative of constraints on the permissible allocation of the record to task records. At least one of the mappings may be formed by mapping those members of the resource set that are more constrained on to one or more members of the task set in preference to those members of the resource set that are less constrained.

At least one of the mappings may be formed by modifying a pre-existing mapping.

Each resource record may have an availability field holding data representative of a period when the respective resource is available. Each task record may have a completion field holding data representative of the time by which the task should be completed. The method may comprise the step of selecting an analysis period. The step of forming the resource set may comprise selecting those resources of the group of resources for which the respective availability field indicates that the resource is available during the selected period and the resource set may comprise a resource record for only the selected resources. The step of forming the task set may comprise selecting those tasks of the group of tasks for which the respective completion field indicates that the task should be completed during or before the selected period and the task set may comprise a task record for only those selected tasks.

The method may comprise determining an extent of reduced availability of the resources. The step of forming the resource set may comprise selecting a subset of the group of resources in accordance with the said extent of availability and the resource set may comprise a resource record for only the resources of the subset.

The method may comprise forming an output based on at least one of the mappings an output representative of at least one of the following: resources that are under-utilised in the mapping, resources re-configuration of which could improve the efficiency of the mapping, data indicative of times at which resources may be allocated to tasks in accordance with the mapping, and data indicative of potential re-allocation of resources.

The present invention will now be described by way of example with reference to the accompanying drawings.

BRIEF DESCRIPTION OF THE DRAWINGS

In the drawings:

FIG. 3 shows pseudo-code for the overall planning process; and

FIG. 4 shows pseudo-code for performing moves to optimise a plan.

DETAILED DESCRIPTION OF THE PREFERRED EMBODIMENT

The present system provides a means for generating capacity and deployment plans. The system may be implemented by means of a conventional computer executing software that is configured for implementing the methods described herein, and that has access to data defining the starting conditions.

Figure 1:
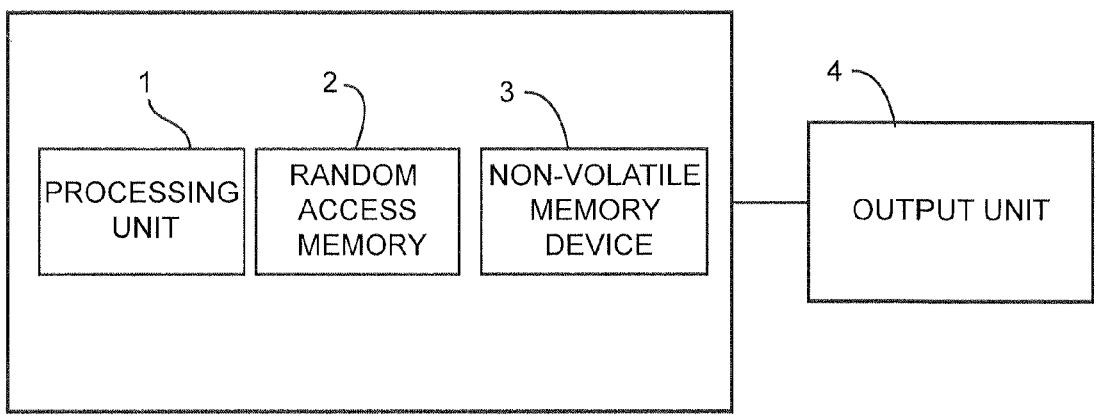
FIG. 1 shows a computer system suitable for implementing the present invention.

FIG. 1 illustrates a suitable computer for implementing the present system. It includes a processing unit 1, a random access memory 2, a non-volatile memory device 3 such as a hard disc drive, and an output unit 4 such as a display. Software suitable for implementing the methods described herein, together with the data defining the starting conditions, are loaded into the non-volatile memory 3. The software is then executed by the processing unit 1 via the random access memory 2 so as to process the data. The result of the processing can be stored or displayed on the output unit 4.

Figure 2:
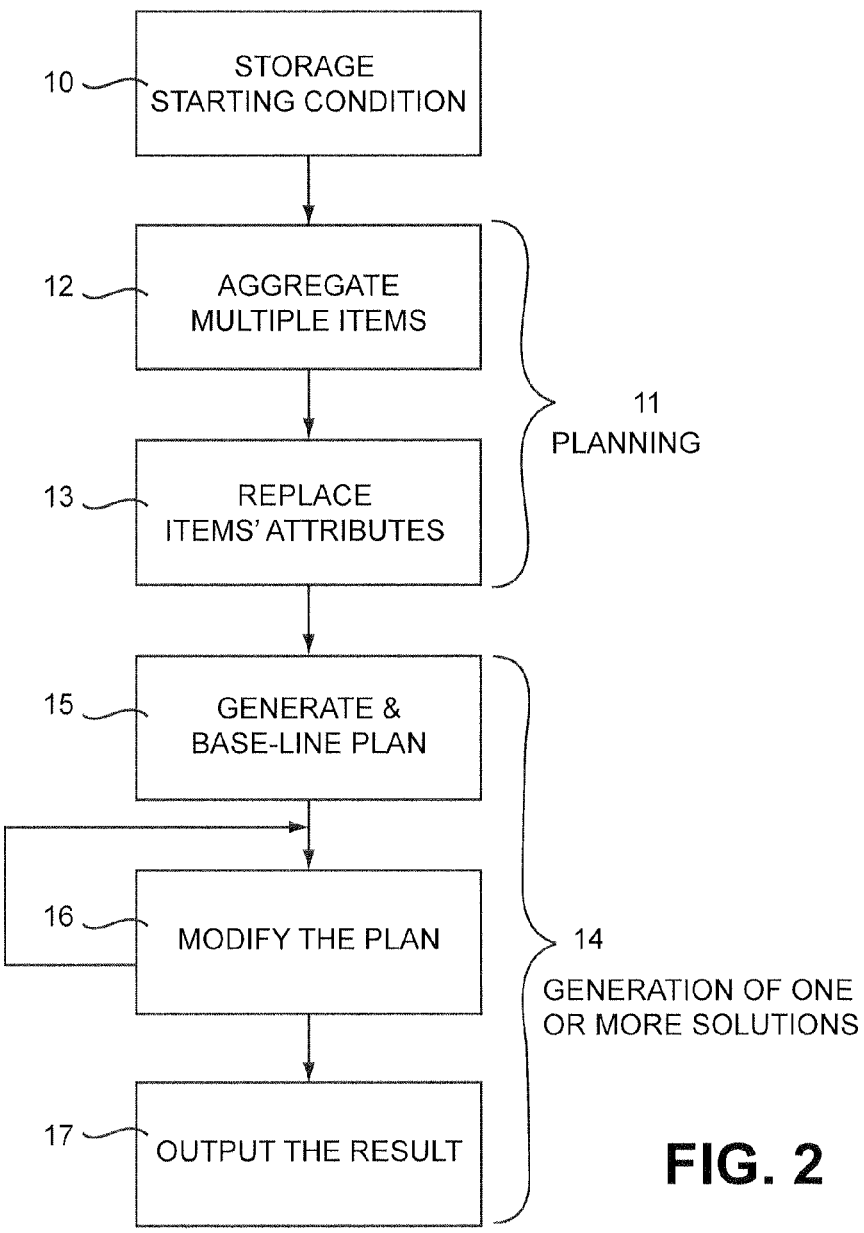
FIG. 2 shows steps in the execution of a planning method.

FIG. 2 illustrates the steps in the present method.

At the outset the starting conditions are defined and stored in a database. (Step 10 in FIG. 2). The starting conditions include:

- A set of tasks with, for each task, the attributes of that task in each of a set of predetermined categories. These categories depend on the nature of the tasks, but could, for example, include the geographical location at which the task is to be performed, the skills required to perform the task, the time by which the task should be completed, and the importance of the task.
- A set of resources with, for each resource, the attributes of that resource in each of a set of predetermined categories. These categories depend on the nature of the resources, but could, for example, include the geographical location at which the resource is based, the skills possessed by the resource and the times at which the resource is available.
- One or more assessment criteria that are to be used in assessing the fitness of any allocation of resources to the tasks. These depend on the priorities of the organisation in question, but could for example include the relative priorities to be put on the satisfaction of various tests such as the performance of tasks before their due time and the minimisation of movement of resources. Further examples will be discussed below.

In the present example, each task has the following categories:

| Category | Indicates |
| --- | --- |
| geographical location | geographical location at which the task must be performed |
| skills required | the skills required to perform the task, including the quantity thereof |
| time window | window of time during which the task must be completed (in normal circumstances the task cannot be started before the window opens, but the organization could choose to fail to perform the task until after the window closes) |
| importance | the organization's level of interest in the job (carry-over jobs, i.e. jobs whose completion is over-due, may be given a higher importance than future jobs) |
| forecast | a flag indicating whether the job is based on a real request or on a demand forecast |
| aggregated | flag indicating whether the task has been aggregated into an aggregated task |

Each resource has the following attributes:

| Category | Indicates |
| --- | --- |
| geographical location | the geographical location(s) at which the resource is or can be located |
| skills available | the skills possessed by the resource |
| availability | the times at which the resource is available |
| preferences for areas, | any preferences for the allocation of the |

-continued

| Category | Indicates |
| --- | --- |
| skills and availability states | resource to tasks of certain types |
| productivity rates for skills | the rate at which the resource can perform its skills |
| aggregated | flag indicating whether the resource task has been aggregated into an aggregated resource |
| type | the type of the resource: e.g. "normal technician", "overtime technician", "loan-in technician", "contractor" |

Each resource and each task may conveniently have a unique identity in the system. Each resource record may conveniently include a field for storing the identities of tasks to which it is allocated, and each task record may conveniently include a flag indicating whether it has been allocated to a resource. The same data structures can be used for storing the attributes of task aggregates and resource aggregates, which will be described below.

Each attribute as specified in the starting conditions may take one of a predetermined set of values for the category in which it falls. For example, the attribute of a resource in the "geographical location" category could take one of the pre-selected values Ipswich, Norwich, Chelmsford or Cambridge. The possible values for an attribute may be defined in a hierarchical manner, so that the attribute may be composed of components that indicate the value of the attribute at different levels. For example, attributes in the "geographical location" category could include a first portion of the form IP, NR, CM, CB indicating the town or city in which the location lies, and a second portion consisting of a number that indicates the location in that town or city.

The attributes of a task will normally remain constant. The planning process may alter the attributes of one or more resources in order to better satisfy the demand represented by the tasks, for example by altering the location attribute of a resource. If the organisation chooses to implement this then the resource would be reconfigured (e.g. by being moved or re-trained) to match the altered attribute.

At least some of the categories of the tasks correspond to categories of the resources, in that they indicate information of a congruent nature. In the present example, the categories "geographical location" correspond to each other, the category "skills required" corresponds to the category "skills available" and the category "time window corresponds to the category "availability". The attributes of each task and resource in the corresponding categories are analysed in the planning process in order to develop a suitable mapping of resources to tasks. In the present example the analysis is on the following basis:

Location: The domain that is to be analysed is divided into geographical areas. This division can be either universally valid, or it can differ from skill to skill or work type to work type. In the later case, the area attribute would be dependent on the skill attribute. Resources can work in certain areas while the location of tasks belongs to one or more areas (overlapping is possible).

Skills: Resources possess skills while tasks require skills. To handle a task successfully, a resource must be correctly skilled. Skills of similar nature are grouped into so called work types. Each skill has a default productivity rate.

Time availability: In order to perform a task a resource must be available at a valid time for performing the task.

The goal of the planning phase is to select a single area or a set of areas, a single skill or a set of skills, and a single availability state from the respective domains for each resource. In the present example, one area, one work type (i.e. a set of related skills) and one availability state have to be chosen, but in general the present system can be configured to handle different requirements. Such allocation is aimed at achieve the best possible satisfaction of the formulated assessment criteria.

In the present system the planning process is performed over a selected planning period. Only those of the tasks that ought to be completed during or before the chosen planning period, and only those resources that are available during the chosen planning period need be considered. Other tasks and resources that are stored in the starting data are ignored during the planning process that is carried out for that period. The user may select a planning period as desired: for example half a day, a day, a week or a month. Longer periods may be analysed as the composite of a number of shorter planning periods.

Once the starting data has been stored, the next step is to simplify the data in order to facilitate the planning process. (11 in FIG. 2). The following simplifications can be made, in accordance with pre-stored conditions:

Aggregation of multiple items into aggregate items (step 12)

Replacement of items' attributes with more general attributes (step 13)

The aggregation stage involves aggregating multiple resources or tasks into aggregate resources or aggregate tasks respectively. In respect of tasks, this step involves:

identifying any groups of two or more tasks that meet a set of pre-defined aggregation conditions, and for each of those identified groups:

forming an aggregate task whose attributes represent the aggregate of the tasks of the group;

storing that aggregated task in the database; and marking the "aggregated" flag of each of the tasks in the group as "true".

An equivalent series of steps is performed for resources.

In subsequent steps of the planning process all tasks and resources whose "aggregated" flag is true are ignored, and instead the newly formed aggregated tasks and resources are considered. This simplifies the planning process. Tests performed by the inventors have shown that in typical scenarios a reduction from thousands of single jobs to a few hundred job aggregates is possible.

The aggregation conditions are intended to allow the system to identify tasks or resources that are sufficiently similar that for planning purposes their individual identities can be ignored. Typically, items that have the same value for an attribute can be aggregated into an aggregated item. This can be extended to two or more attributes. Items can also be aggregated if their values for an attribute are not equal but all satisfy a certain condition. For example:

All resources that have the same location, availability and set of skills could be aggregated into an aggregate resource that has that location, availability and set of skills, but whose productivity rate represents the aggregate of those resources.

All resources that have the same location and skills, whose productivity rates are within a pre-set threshold of each other and whose availabilities do not overlap could be combined into an aggregate resource that has that location, an aggregate of the individual resources availabilities and the average productivity rate of those resources.

The replacement of tasks' attributes with more general attributes involves the following steps:

comparing the attributes of each task with a set of stored simplification criteria if any attribute of a task matches a simplification criterion, replacing that attribute with a generic attribute associated with that simplification criterion.

For example, one simplification criterion could specify that tasks whose location is IP10, IP11 or IP12 have their location attribute replaced with IP10, as a generic indicator of a geographical region. Where the planning process is to be performed for a single period, e.g. a day or a week, a simplification criterion may specify that all tasks whose window falls within that period are given one value for their time window attribute, and all other tasks are given another value.

The assessment criteria are defined with the aim of rating the quality of a particular solution (i.e. a mapping of resource to demand). The assessment criteria should provide a concrete model that reflects the influence of business targets.

Job Aggregate Clearance Score

A solution will involve the mapping of one or more tasks or task aggregates to each resource. For each mapped task or task aggregate a "job aggregate clearance score" (jacs) can be calculated. This represents a numeric measure of the value to the organisation of that task or aggregate being cleared. The jacs is calculated as follows:

$$jacs(JA) = \text{importance}(JA) \cdot \frac{\text{volume}(JA)}{\text{productivity}(JA)}.$$

where importance(JA) is the importance of the mapped task or aggregate, volume(JA) is the quantity of the mapped task or aggregate and productivity(JA) is the productivity of the resource. Rather than being purely dependent on the importance of the job aggregate and the volume done, this formula normalises the result with regard to the productivity. The advantage of this is that it takes account of the time required to handle the work. The longer this work takes, the higher is the jacs.

To illustrate this relationship, let us consider two job aggregates JA1 and JA2. Both have the same importance of 5, and the required skills have productivity rates of 10 and 20. Clearing a volume of 1.0 yields for JA1 a job aggregate clearance score of $$jacs(JA1) = 5 \cdot \frac{1}{10} = 0.5$$

and for JA2 a score of $$jacs(JA2) = 5 \cdot \frac{1}{20} = 0.25.$$

Although the two required skills are considered equally vital for the business, clearing JA1 returns twice the reward of clearing JA2 as this work also takes twice as long. If however, a volume of 2.0 is cleared for JA2 (which takes as long as clearing a volume of 1.0 for JA1) then the two job aggregate clearance scores are the same:

$$jacs(JA2) = 5 \cdot \frac{2}{20} = 0.5.$$

Rather than only judging the importance of job volumes done, this also takes into account the time needed for processed job volumes. Higher scores indicate the clearance of more vital work.

Technician Clearance Score

The technician clearance score (tcs) for a resource such as a technician T is the sum of the job aggregate clearance scores for all tasks or task aggregates $\{JA_1, \ldots, JA_n\}$ assigned to this resource:

$$tcs(T) = \sum_{i=1}^{n} jacs(JA_i).$$

This function is a measure for the importance of the work done by the resource. Again, higher values are desirable as they indicate the clearance of more significant work. A higher score indicates a better solution.

Technician Score

The technician score (ts), is based on the technician clearance score. Its aim is to incorporate further business objectives into the judgement of a resource's deployment. More specifically, it modifies the tcs of a resource depending on the beneficial utilisation of the resource in accordance with the resource's mapping on to a task, for example taking into account the resource's preference values for the assigned area, skills and state that are associated with that task. Furthermore, penalties are applied in case of underutilisation or if the resource is brought in at extra expense, for example as additional workforce or as a contractor as indicated by the "type" attribute of the resource. The formula for the technician score of a resource T is given below:

ts(T)=tcs(T)• areaPenalty(area(T))• skillsPenalty(skills(T))• statePenalty(state(T))• underutilisationPenalty(utilisation(T))• additionalWorkForcePenalty(T)

The five penalty components are values between 0 and 1 inclusive and hence the ts is never greater than the original technician clearance score: i.e. $(0 \leq ts(t) \leq tcs(T))$. The penalty functions can readily be defined in any suitable manner to meet business requirements. For example, one possible area penalty function returns 1 if the resource is deployed to its preferred area and otherwise it returns a fixed, user-set value from the interval [0, 1]. In the extreme case of a penalty factor of 0, the technician score would always evaluate to 0 except for the preferred area. Therefore, the score would always be the highest in the home area. In the opposite extreme case of a penalty factor of 1, the technician score would not be affected by the area penalty. By choosing a value from [0, 1], a user of the planning tool can therefore decide how strongly moves away from the preferred area are penalized. Consequently, resource mobility can be managed and limited through this measure.

Objective Function

The objective function (obj) is the sum of technician scores of all deployed resources $\{T_1, \ldots, T_m\}$:

$$obj = \sum_{i=1}^{m} ts(T_i).$$

This function is therefore a measure for the quality of the resource deployments with regard to the formulated business objectives. This includes not only a judgement of the job volumes done, but many additional business targets.

Various business goals affect and influence the objective function and the planning system. Their weighting and thus their interaction can be controlled by a user. These include quality of service business goals and service costs business goals. Some examples of these goals are set out below.

Quality-of-Service Business Goals:

Satisfying demand with correctly equipped and placed resources. This goal is satisfied by correctly matching resources to demand, i.e. by assigning the right type of job aggregates to resources, with regard to area and skill. When employed, this requirement is a hard constraint and has therefore always to be satisfied.

Satisfying as much demand as possible. Satisfaction of this goal is indicated by means of the job aggregate clearance score function. The higher the satisfied demand (volume), the better is the result.

Satisfying high priority demand preferentially. Achievement of this objective is also represented by the job aggregate clearance score function. The importance and thus priority of cleared demand aggregates is a direct factor within this measure. A user can change importance scores for work types and thus directly influence the weighting of demand priorities.

Satisfying demand within agreed time limits. The aggregation of single jobs into job aggregates includes, as discussed earlier, an importance modification with regard to carry-over, demand and future work. This importance value is used and thus once more covered by the job aggregate clearance score function. The additional importance and thus weighting of carry-over, demand and future work can be customised.

Service Costs Business Goals:

Deploy resources in accordance with to their preferred areas/skills/rosters. These factors are part of the technician score function. It applies penalties if a resource is not deployed to the preferred choices. As the penalties depend on the resources' preferences, and as these preferences are subject to user choice, the influence of these business targets can be fully controlled. The assignment of resources to non-preferred areas and skills has further consequences which influence the objective function indirectly. Sending a resource such as an engineer away from the default area, for instance, leads to a capacity loss. The amount of loss is directly proportional to the area preference of the new area. Forcing engineers to use non-default skills leads similarly to productivity losses. Both factors contribute to lessened efficiencies.

Deploy resources so that their labour is fully utilised. Satisfying this business target is not part of the objective function but is sought by the planning engine itself: as long as a resource can do more work and more work is available, it will assign this work to the resource.

Deploy available resources first before bringing in further manpower. This objective is again modelled within the technician score function. It applies a penalty if work is assigned to an additional resource. The amount of this penalty can be varied by the user.

Identify underutilised resources and make them available for reassignment. This business goal is not part of the objective function. However, the planning system comprises functionality for the identification and handling of underutilised resources. The workload threshold for underutilisation is controlled by a parameter.

Once the data, including the assessment criteria are stored in the database, the system moves on to the generation of one or more solutions: i.e. one or more mappings of resources to tasks. (14 in FIG. 2). This is performed by generating a base-line plan (step 15), repeatedly modifying that plan and retaining the modification only if there is an improvement over the previous version (step 16), and once a predetermined threshold of processing time or optimisation is reached outputting the result (step 17).

Solutions are generated by executing a planning method by means of a computer system such as that shown in FIG. 1. Software for execution by the computer executes the various steps of the planning method. The high-level algorithm of the planning method is illustrated by pseudo-code in FIG. 3. Planning takes places for a certain time window, which is broken down into a number of planning periods. Such planning windows traditionally span, for instance, a week or ten days and be partitioned into daily segments. The present system is more versatile. By using generic planning periods, the planning window can be divided into time segments of user-defined nature. A typical example is the organisation of work in half-day blocks. The algorithm comprises six steps (101-106) which are repeated for each planning period.

In the first step (101) the system identifies from the database the records of all resources that are available during the planning period under consideration. A record containing the attribute data is built for each of those resources.

All tasks that have not been completed in an earlier period are combined into aggregates where possible (step 102), according to the pre-stored rules for the aggregation of tasks. These task aggregates, together with any remaining unaggregated tasks, are initially not assigned to any resource.

A simple, un-optimised base-line plan is generated (step 103). This is generated by the allocation of a suitable resource to some or all of the tasks in the manner described in more detail below.

The base-line plan is modified repeatedly (step 104) by altering the allocation of resources to tasks. This may involve allocating a resource to a task or task aggregate that was previously unallocated, allocating a different resource to a particular task or task aggregate, or removing the allocation of a resource to a task or task aggregate. The modifications may be done randomly or by the use of an algorithm that aims at efficient allocation of resources. After each modification, or after a series of modifications, the values of the objective functions are calculated for the modified plan and compared with the values for the previous version of the plan. If the values of the objective functions for the modified version of the plan indicate that it is better than the previous version then modified plan is adopted as the base for further modifications. Otherwise the modified plan is discarded and further modifications are based on the previous version. This process is repeated until a certain number of iterations have been performed.

The version of the plan that has been adopted at the end of step 104 is taken as the plan for the current period. Those tasks that are allocated in the plan are removed from the list of outstanding tasks to be considered in the next planning period. (Step 105). The remaining tasks will be carried over for allocation in the next planning period iteration.

Information on the adopted plan is output to the user in step 106.

After iterating over all planning periods, the respective output plans for each of the periods are combined to form a final, overall solution.

An important characteristic of the algorithm is the iterative construction of the solution. Rather than generating a single solution for the whole planning window at once, the method iteratively constructs a partial solution for each of the planning periods. At the end, the combination of all partial data yields a complete solution. Solving smaller sub-problems reduces the considered problem size per step and accelerates the overall planning process.

Assigning areas, skills and an availability state to each resource involves the allocation of unassigned tasks or task aggregates to these resources. As long as a resource has free capacity, i.e. as long as the work assigned to that resource so far will take the resource less time to complete than the time for which the resource is available and unassigned during the period, under consideration, the system can try shifting more tasks or task aggregates to the resource.

The job aggregate selection is importance based. That means that among all correctly matched job aggregates the one with the highest importance score is always considered first. An allocation involves the removal of the considered job aggregate from the pool of unassigned work and its storage within or in association with a resource's record, thereby marking it as assigned work. If the resource can only process a fraction of a job aggregate, then it is split into two parts whose volumes add up to the volume of the original aggregate. One part stays in the pool of unassigned work, the other part becomes assigned. In this way a single task can be divided between multiple resources.

As indicated above, first an initial base-line plan is generated, and then that plan can be modified so as to improve its usage of resources and fulfillment of available tasks. The initial base-line plan can be generated in a relatively unsophisticated way, since it will be subsequently optimised. Generating this base-line plan consists of the assignment of all resources in accordance with their preferred area, skill and time availability choices. However, the order of this assignment process is not arbitrary. The most constrained resources are assigned first. In this regard the constraint of resources is measured with reference to their flexibility, i.e. the number of available area/skill choices, and the amount of work available that could be assigned to those resources. This prioritization ensures that resources with limited choices have a higher chance of being allocated to tasks than would be the case if they were allocated later.

The optimisation of the initial base line plan lies at the heart of the planning system. Its aim is plan improvement, i.e. plan modification so that the objective function evaluation becomes maximized within a reasonable timeframe.

A fundamental element of the optimisation process is the concept of a move. Generally speaking, a move describes a small alteration of a plan. Through performing a sequence of moves, the plan can be gradually transformed and thus improved. The present system makes use of three different move types:

"Move-to" moves: This move type changes the assignment of a single resource. The resource is removed from the current area/skill/availability choice and is instead moved to a new area/skill/availability choice. While the initially assigned tasks or task aggregates are removed from the resource's record and are placed back into the pool of unassigned work, the resource is allocated one or more tasks or task aggregates for the new assignment.

"Swap" moves: A swap move is the exchange of the area/skill/availability choices between two resources. Again, both resources return their initially assigned tasks or aggregates to the pool and are assigned new tasks or task aggregates at their new placement. Such a move is of course only possible if the new assignments are legal for both resources.

"Replace" moves: The replace move involves two or more resources that form a endless chain. Each resource in the chain apart from the last is allocated one or more tasks/aggregates that were previously allocated to the next resource in the chain. As this move operator can become complex, the chain length is preferably be limited to ensure manageability. In the current system, this limit is fixed at a length of three.

The moves can be applied to resources and/or resource aggregates.

Various known strategies can be used selecting the sequence of operations to be performed during the optimisation process. Such strategies include simulated annealing, Tabu search, genetic algorithms, and a hill climbing approach. The hill climbing approach has been found to be particularly suitable because although more basic than other options it can be performed more quickly. A preferred optimisation algorithm is illustrated by the pseudo-code shown in FIG. 4. Using the base-line plan as its point of start, this method applies move-to, swap and replace move operators to that base-line plan. If any of these moves leads to an improvement of the chosen objective function then the move is accepted, otherwise it is rejected and the changes are reversed. During each cycle of the main optimisation loop, all single resources are tried to be moved, all pairs of resources are tried to be swapped and all possible chains of resources are subjected to potential replacement moves. As long as such a cycle leads to an overall objective improvement, the optimisation continues. When no further improvements can be detected any more, the optimisation process is halted and the modified and improved plan is returned. If other optimisation algorithms were to be used then the logic could be used to select a subset of the possible moves to be tried.

In the most preferred embodiment all tasks are translated into task aggregates, and both the base-line plan generation and the optimisation routine work only with these aggregates. This generalization has been found to be sufficient for these two processes and leads to a significant computation speed-up. However, several solution analysis tasks as well as the mechanism for building aggregates for the next planning period then require a re-translation back to single demand units. Transforming done or undone task aggregates back into single done or undone tasks can only be an approximation as these aggregates can show real valued volumes. The processing of a volume of 1.5 of a job aggregate can be, for instance, interpreted as the processing of either one or two tasks. The first step of the determination process of undone tasks is therefore the rounding of the volume of all aggregates in the pool of undone task aggregates. These volumes are rounded up or down while keeping the rounded overall sum constant. In a second step, the rounded aggregates in the pool of undone work are used for deciding which of the initially undone tasks remain undone. This is achieved by matching each aggregate to their corresponding tasks. The volume of the aggregate determines how many of the corresponding single tasks are marked as still undone. The selection process of undone tasks is based on the end of the time window of these tasks: tasks that have to be completed later are always considered first. In case of the same completion time point, forecasted tasks take precedence over actual tasks when marking undone work. At the end of this procedure, each of the initially unprocessed tasks for the current planning period is either marked as still undone, or it is not marked and thus considered as done.

The generated solution (i.e. the generated capacity and deployment plans) can be analysed to provide information to resource managers and also serve as input into other systems that could utilise the data in the plan. Some examples of results that can be derived from the solution analysis process are listed below.

Under-Utilised Resources: Under utilised resources are resources whose utilisation in the deployment plan falls below a specified utilisation threshold. This analysis can not only identify which the under utilised resources are but finds the reason(s) why they are under utilised and then makes recommendations on how to better utilise the resources. The reason(s) for a resource being under utilised could be due to a number of factors. These factors include attribute values and preferences from the resource's profile, the number of tasks available and the specified utilisation threshold. For example, it could be because there are too few tasks in the resource's preferred working location(s). The recommendations on the other hand can suggest the best possible way(s) to utilise the resource, again this is based on the resource's profile and the number of jobs available. The recommendation can be of the form: resource deployed to location l using skill s would be potentially utilised to 100% of its availability.

Available Capacity: The available capacity is an indicator as to how many resources will be available, and how much of that available capacity will be utilised. The available capacity does not specify the capacity needed to do the jobs but rather the capacity from the available resources that will be used.

Required Capacity: The required capacity specified is in two parts. On part of the required capacity specifies the capacity in terms of numbers, i.e. how many additional resources will be needed to satisfy the entire demand. The other part of the required capacity specifies in more detail, values for some attributes that the required resources would have to possess to satisfy the demand. The values for the attributes specified are the location where the resource will be needed, the skill which the resource will work on and the availability of the resource.

Deployment Plan for Scheduler: The deployment plan would serve as a guide for scheduling systems. Since the deployment plan that has been generated specifies the values of the location and skill attributes for the resource, these can form the basis for the scheduler in later assigning tasks to the resource. Because the deployment plan is at a finer grained level than the capacity plan, that sort of detail can easily be provided to a scheduling system.

Training Recommendation: Training recommendations, similar to under utilised recommendations can serve as a guide for resource managers when planning training programmes for their technicians. The recommendations could be based on, for example, the skill(s) there are frequently occurring shortages. Similarly, the same analysis could indicate that reconfigurable devices such as general-purpose computing servers should be reconfigured to provide different services.

Input to Appointment Booking System: It may be that an appointment booking system needs to book appointment for customers when they contact the service organisation about faults and/or problems. To make the appointment for the customer, it will be best if the appointment system had access to available resource capacity a specified time period against which the appointment can be booked. From the capacity and deployment plans generated, this can serve as input to the appointment system and can be used in determining the available capacity against which the appointment can be booked.

Appointments at times when fewer resources or fewer unallocated resources are available could be charged at a higher rate than other appointments.

Input to Resource Redistribution System: A resource redistribution system which tries to achieve a balanced distribution of resources across a geographical region could take as input the under-utilised resource from a given geographical location and try to match them to required resources in another geographical location and vice versa. Such a resource redistribution system could, for example, be similar to that described in US2004/249743.

The present system can be configured to take account of projected downtime of the resources. Such downtime could be due to planned factors such as regular maintenance or pre-booked vacation leave, or unplanned factors such as random failures or sick leave. Based on planned downtime and/or a statistically expected level of unplanned downtime the available resource capacity can be reduced prior to the steps of allocating resources to tasks. For example, from historical data it could be anticipated that during a given period there will be an absence rate of 15% among resources. Accordingly the available resources would be reduced by the same percentage.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for allocating resources of a group of resources to tasks of a group of tasks, the method comprising:
    forming a resource set comprising a resource record of a plurality of resources, each resource record having one or more fields representative of attributes of the respective resource;
    forming a task set comprising a task record of a plurality of tasks, each task record having one or more fields, each field holding data representative of an attribute of the respective task;
    condensing the task set by one or more iterations of the steps of:
        i. selecting two or more tasks of the task set;
        ii. adding to the task set an aggregate task record created from said two or more tasks having one or more fields, each such field corresponding to a field of each of the task records of the selected tasks and holding data representative of the collective attributes of the task records of the selected tasks in those fields; and
        iii. removing the task records of the selected tasks from the task set;
    forming at least two mappings of some or all of the members of the resource set on to one or more members of the task set;
    calculating, for each of the mappings, a rating value dependent on the allocation of resources to the or each aggregate task in that mapping, said allocation being dependent on the attributes of each of the resources and each task or aggregate task;
    comparing the rating values of the mappings; and
    selecting one of the mappings with the higher rating value for further processing in dependence on the result of the said comparing step, wherein
    the rating value of each mapping is calculated in dependence on a clearance score for each member of the task set that is in that mapping mapped to a member of the resource set, the clearance score for a record being the product of an importance attribute of that member and a volume attribute of that member divided by a productivity attribute of the member of the resource set to which it is mapped.

2. A method as claimed in claim 1, comprising condensing the task set by multiple iterations of the steps i to iii until all task records have been removed from the task set.

3. A method as claimed in claim 1, comprising condensing the resource set by one or more iterations of the steps of:
    a. selecting two or more resources of the resource set;
    b. adding to the resource set an aggregate resource record having one or more fields, each such field corresponding to a field of each of the resource records of the selected resources and holding data representative of the collective attributes of the resource records of the selected resources in those fields; and
    c. removing the resource records of the selected resources from the resource set.

4. A method as claimed in claim 3, comprising condensing the resource set by multiple iterations of the steps a to c until all resource records have been removed from the resource set.

5. A method as claimed in claim 3, wherein
    the attributes of each task record and of each aggregate task record include an importance attribute indicative of an importance of the respective task and a volume attribute indicative of the volume of the respective task.

6. A method as claimed in claim 5, wherein
    the attributes of each resource record and of each aggregate resource record include a productivity attribute indicative of the productivity of the respective resource.

7. A method as claimed in claim 1, wherein the rating value of each mapping is calculated in dependence on the sum of the clearance scores for all members of the task set that are in the mapping mapped to a member of the resource set.

8. A method as claimed in claim 1, wherein the rating value of each mapping is calculated in dependence on the sum of the product of the clearance score for each member of the task set that is in the mapping mapped to a member of the resource set and a weighting value representative of the beneficial utilisation of the resource record that is in that mapping mapped to the respective member of the task set.

9. A method as claimed in claim 1, wherein the attributes of each resource record and of each aggregate resource record include one or more attributes indicative of constraints on the permissible allocation of the record to task records, and at least one of the mappings is formed by mapping those members of the resource set that are more constrained on to one or more members of the task set in preference to those members of the resource set that are less constrained.

10. A method as claimed in claim 1, wherein at least one of the mappings is formed by modifying a pre-existing mapping.

11. A method as claimed in claim 1, wherein the method is performed by means of a computer configured to perform the method.

12. A method as claimed in claim 1, wherein:
    each resource record has an availability field holding data representative of a period when the respective resource is available;

each task record has a completion field holding data representative of the time by which the task should be completed; and the method comprises the steps of:

selecting an analysis period;

the step of forming the resource set comprises selecting those resources of the group of resources for which the respective availability field indicates that the resource is available during the selected period and the resource set comprises a resource record for only the selected resources; and the step of forming the task set comprises selecting those tasks of the group of tasks for which the respective completion field indicates that the task should be completed during or before the selected period and the task set comprises a task record for only those selected tasks.

13. A method as claimed in claim 1, wherein the method comprises determining a decrease in the availability of the resources; and wherein the step of forming the resource set comprises selecting a subset of the group of resources in accordance with the extent of the decrease in the availability and the resource set comprises a resource record for only the resources of the subset.

14. A method as claimed in claim 1, comprising forming an output based on at least one of the mappings an output representative of at least one of the following: resources that are under-utilised in the mapping, resources re-configuration of which could improve the efficiency of the mapping, data indicative of times at which resources may be allocated to tasks in accordance with the mapping, and data indicative of potential re-allocation of resources.

15. A computer configured to allocate resources of a group of resources to tasks of a group of tasks, by a method comprising:

forming a resource set comprising a resource record of a plurality of resources, each resource record having one or more fields representative of attributes of the respective resource;

forming a task set comprising a task record of a plurality of resources, each task record having one or more fields, each field holding data representative of an attribute of the respective task;

condensing the task set by one or more iterations of the steps of:
  i. selecting two or more tasks of the task set;
  ii. adding to the task set an aggregate task record created from said two or more tasks having one or more fields, each such field corresponding to a field of each of the task records of the selected tasks and holding data representative of the collective attributes of the task records of the selected tasks in those fields; and
  iii. removing the task records of the selected tasks from the task set;

forming at least two mappings of some or all of the members of the resource set on to one or more members of the task set;

calculating, for each of the mappings, a rating value dependent on the allocation of resources to the or each aggregate task in that mapping, said allocation being dependent on the attributes of each of the resources and each task or aggregate task;

comparing the rating values of the mappings; and selecting one of the mappings with the higher rating value for further processing in dependence on the result of the said comparing step, wherein the rating value of each mapping is calculated in dependence on a clearance score for each member of the task set that is in that mapping mapped to a member of the resource set, the clearance score for a record being the product of an importance attribute of that member and a volume attribute of that member divided by a productivity attribute of the member of the resource set to which it is mapped.

* * * * *